Patented Apr. 15, 1924.

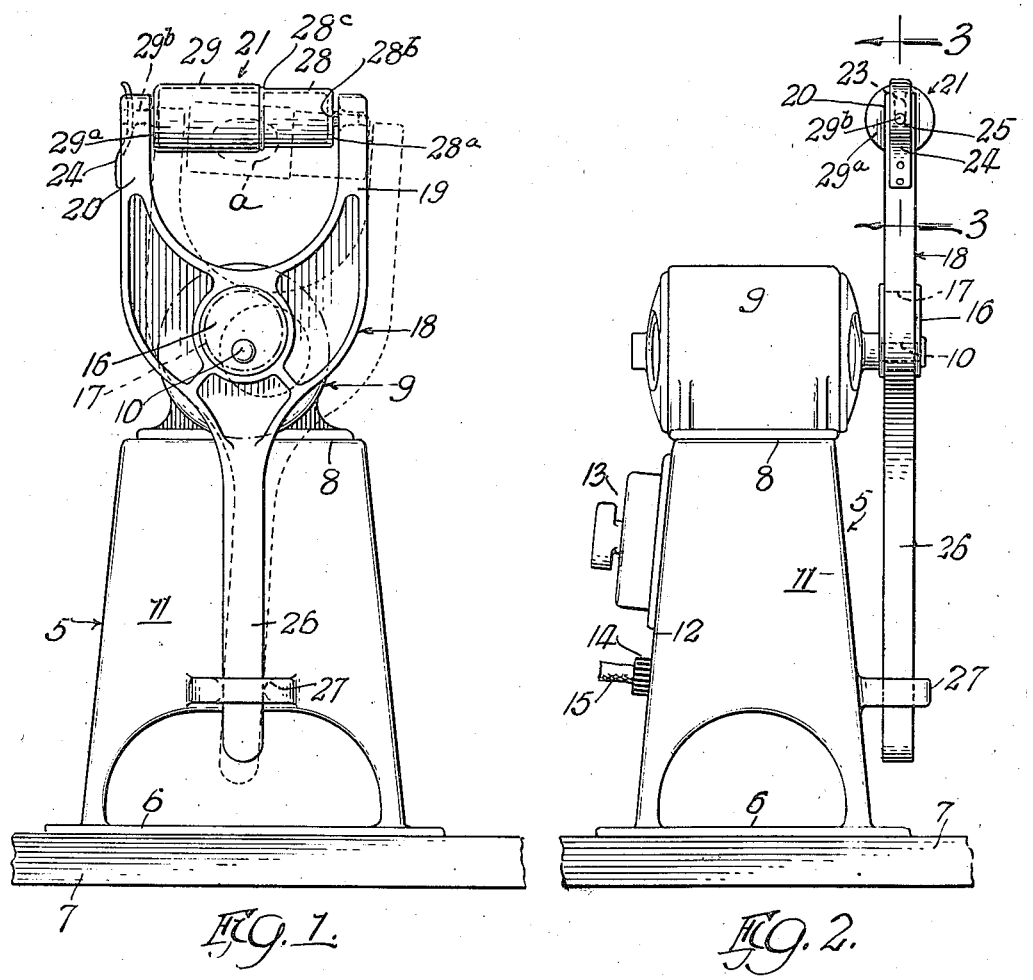

1,490,214

UNITED STATES PATENT OFFICE.

ALVIN L. JOHNSON, OF ROCK FALLS, ILLINOIS.

DENTAL AMALGAM MIXER.

Application filed March 5, 1923. Serial No. 622,747.

*To all whom it may concern:*

Be it known that I, ALVIN L. JOHNSON, a citizen of the United States, and a resident of Rock Falls, in the county of Whiteside and State of Illinois, have invented certain new and useful Improvements in Dental Amalgam Mixers; and I do hereby declare that the following is a full, clear, and exact description thereof, reference being had to the accompanying drawings, and to the reference numerals marked thereon, which form a part of this specification.

This invention relates to improvements in dental amalgam mixers and consists of the matters hereinafter described and more particularly pointed out in the appended claims.

One of the objects of the present invention is to provide a small, compact and portable, motor driven device by means of which the alloy and mercury forming a dental amalgam may be quickly and thoroughly mixed.

Another object of the invention is to so construct the mixer that the container or capsule for the constituents of the amalgam is caused to travel in an elliptical path, thus imparting to said constituents a greater number of impacts, during each cycle of operation, thereby insuring a more uniform and evenly mixed amalgam in a shorter period of time.

A further object of the invention is to provide an improved means by which the container or capsule is positively held in position against accidental dislodgment, but which means is so constructed that said container or capsule may be easily removed and replaced.

These objects of the invention, as well as the many advantages thereof will more fully appear as I proceed with my specification.

In the drawings:—

Fig. 1 is a view in front elevation of a dental amalgam mixer embodying my invention.

Fig. 2 is a view in side elevation thereof.

Fig. 3 is a vertical detail sectional view on an enlarged scale, as taken on the line 3—3 of Fig. 2.

Fig. 4 is a longitudinal sectional view through a modified form of container embodying my invention.

In general my improved dental amalgam mixer includes a motor mounted upon an upright standard which is adapted to be secured to a suitable base or support. Fixed to the armature shaft of the motor is an eccentric which engages in a suitable bearing opening located between the ends of an operating member or lever. The top end of said operating member is forked to provide spaced tines or arms in which the container for the constituents of the amalgam is removably mounted. The bottom end of said lever has a sliding guided bearing in a retaining means which may be mounted either on the standard or on the base so that the container is caused to travel in an elliptical path.

Referring now in detail to that embodiment of the invention illustrated in Figs. 1 to 3 inclusive of the accompanying drawings:—5 indicates an upright, hollow standard upon which the operating parts of my improved dental amalgam mixer are mounted. As shown herein said standard is of a rectangular cross section and tapers toward its top end,—the bottom end being formed to provide legs at the corners which are made integral with a suitable horizontal flange 6 by means of which the standard may be secured to any suitable support or base 7. Secured to the top wall 8 of the standard is a small electric motor 9 which has an armature shaft 10 that projects beyond the plane of the front wall 11 of said standard. On the rear wall 12 of the standard 5 is a circuit controlling switch 13 and below the same is an inlet bushing 14 for the current conductor 15.

16 indicates an eccentric disc which is secured to the armature shaft 10 of the motor. Said disc bears in a suitable opening 17 provided at a point a suitable distance between the top and bottom ends of a forked shaped operating member or lever 18. Said eccentric disc is provided on opposite ends with flanges which prevent displacement between the said disc and operating member. The top end of said lever is formed to provide spaced tines or arms 19 and 20 respectively, in which a container 21 preferably in the form of a capsule is adapted to be removably mounted. The arm 19 (see Figure 3) has a horizontally disposed hole 22 therein, the inner end of which is flared to a greater diameter; and the arm 20 has a vertically disposed recess 23, arranged in line with the hole 22,—said notch opening through the top end of said arm. Fixed to the outer surface of the arm 20 just below the recess 23 is the bottom end of a yielding member or leaf spring 24. The central body part of said spring is arranged to normally extend within the recess 23 while the top end of said spring is extended above and is bent outwardly from the top end of the arm 20, so as to be easily engaged for the purpose of manipulation. In the main body part of said yielding member or spring is a hole 25 (see Figure 3) arranged coaxially with respect to the bearing hole 22 in the other arm 19.

The bottom part or stem 26 of the operating member 18 is made of a width considerably less than its top part and has guided sliding bearing in a suitable recess formed in a lug 27 which may be mounted on either the standard 5 or base 7. As shown herein, said lug is made integral with and extends forwardly from the front wall 11 of the standard, near its bottom end.

The container 21 comprises two tubular cup-like parts 28, 29 respectively, the one telescopic within the other and each made of any suitable material which may or may not be transparent. As shown herein, each cup-like part 28, 29, has a flat end wall $28^a$, $29^a$ respectively, and made integral with each flat end wall is an axially disposed pin or trunnion $28^b$, $29^b$, respectively. On the tubular cup-like part 28 of smaller diameter, near its open end is an annular shoulder $28^c$ which limits the telescoping of the one part within the other and which necessarily determines the length of the container between said flat end walls. This length is substantially the same as the distance between the inner surfaces of the arms 19 and 20 respectively.

In operation, the desired amount of alloy and mercury to form the amalgam is placed in one of the container parts, preferably the part 28 which is held in an upright position, after which the other larger cup-like part 29 is positioned over the first and the two are telescoped, the one upon the other, until the shoulder $28^c$ is engaged by the end of the part 29. The container as a whole is then inserted in position between the arms 19 and 20 by first inserting the pin $28^b$ in the hole 22 of the arm 19 and then bringing the other pin $29^b$ into engagement with the top end of the leaf spring 24 which yields outwardly until the pin aligns with and enters the hole 25 therein. The spring will then return to its normal position and lock the container securely in place between said arms. The switch 13 is then actuated to start the motor.

By the rotation of the armature shaft 10 of the motor and the eccentric disc 16 thereon and by reason of the sliding guiding bearing of the bottom end 26 of the operating member 18 as before mentioned, the lever is given a combined lateral and lengthwise vibratory movement. The lateral movement of the lever is, as illustrated, greater than the lengthwise movement, so that the end of the lever bearing the container is caused to move in a substantially elliptical path, with the greater axis of the ellipse transverse to the axis or length of the lever. During this movement or travel of the container the mercury and alloy are violently agitated and receive an impact at both ends and at the top and bottom parts of the path of travel of the container so that the mass is broken up a number of times, thus insuring a thorough mixing of the constituents. The "balling up" of the mass of amalgam is prevented by reason of its forceful and repeated engagement with the flat ends of the container which breaks up the mass.

In Figure 1 I have shown an ellipse by the dotted lines "a" which indicate the path of travel of the center of the container,—it being understood of course, that the path of travel of the ends of the container is correspondingly greater.

To remove the container, the top end of the spring 24 is moved outwardly until the pin $29^b$ on the associated end of the container is released therefrom, after which said end may be tilted upward and then moved longitudinally to withdraw the pin $28^b$ on the other end of the container from the hole 22 in the arm 19. The container is then opened in the usual manner and the amalgam removed therefrom.

In Fig. 4 I have shown a modified form of container in which the telescoping members are made of a transparent material with metallic ends. In said figure, 30, 31 indicate the tubular bodies of said members which are preferably made of glass, and $30^a$, $31^a$ indicate metallic caps providing the flattened ends of said bodies,—said body members and caps being suitably cemented together. Each metallic cap includes an axially disposed pin $30^b$, $31^b$ adapted to be engaged in the arms 19 and 20 of the operating member 18 as before described. By reason of the tubular glass body parts, the condition of the constituents of the amalgam is visible to the operator during the operation of the device, and thus he may more readily determine the desired consistency thereof.

The many advantages of the invention are apparent from the foregoing description. By reason of the elliptical path of travel of the container, the mercury and alloy are mixed to the desired consistency in the minimum of time. The container may be readily inserted in position on the operating member and may be as readily removed therefrom and this without the use of tools of any kind. The device as a whole is small and compact, is easy to manipulate and may be readily moved about to the position most convenient for the operator.

While in describing my invention I have referred to certain details of mechanical construction and arrangement of parts, I do not wish to be limited thereto, except as may be pointed out in the appended claims.

I claim as my invention:

1. In a device of the kind described, the combination of a driven shaft, an eccentric secured thereto, an operating member in which said eccentric has bearing, said operating member having two spaced arms at its top end, a telescopic container having flat end walls, with a pin projecting from each end wall, means carried by said spaced arms to removably receive said container pins, and means in which the bottom end of said operating member has a sliding guided bearing so that the container carried by the arms at the top end of said operating member, is caused to travel in an elliptical path during the rotation of said eccentric.

2. In a device of the kind described, the combination of an upright standard, a motor having an armature shaft mounted on the top end of said standard, an eccentric fixed to said shaft, an operating member in which said eccentric has bearing, said operating member having two spaced arms at its top end, a telescopic container having flat end walls with a pin projecting from each end wall, means carried by said arms to removably receive said container pins, and means providing a sliding bearing for the bottom end of said operating member so that the container carried by the arms at the top end of said operating member is caused to travel in an elliptical path during the rotation of said eccentric.

3. In a device of the kind described, the combination of an upright standard, a motor having an armature shaft mounted on the top end of said standard, an eccentric fixed to said shaft, an operating member in which said eccentric has bearing, said operating member having two spaced arms at its top end, a telescopic container having flat end walls with a pin projecting from each end wall, means carried by said arms to removably receive said container pins, and means provided near the bottom end of said standard in which the bottom end of said operating member has a sliding guided bearing so that the container carried by the arms at the top end of said operating member is caused to travel in an elliptical path during the rotation of said eccentric.

4. In a device of the kind described, the combination of an operating member having two, spaced arms at one end, one of said arms having a horizontally disposed hole therethrough and the other arm having a notch opening through the top end thereof, a yielding member fixed to said second mentioned arm and having a hole disposed in line with the hole of the first mentioned arm, and a telescopic capsule-like container having flat ends with a pin projecting from each flat end, one of said pins being adapted to be engaged in the hole of one arm and the other pin being adapted to engage in the recess in the other arm and to extend into the hole in said yielding member.

5. A container for use in connection with a device of the kind described, comprising two telescopic, tubular members, each having a flat, outer end wall, and a longitudinally arranged pin extending outwardly from each flat outer end wall.

6. In a device of the kind described, a lever, means at one end of said lever for supporting a container with its axis transverse to the axis of said lever, and a driving member operatively connected to said lever to impart a combined lateral and lengthwise vibratory movement to said lever to cause the aforementioned supporting end of said lever to move in a substantially elliptical path.

7. In combination, a support, a motor mounted thereon, a lever adjacent said motor, a container removably connected to one end of said lever with its axis transverse to the axis of said lever, and means operatively connecting said motor to said lever to impart a combined lateral and lengthwise vibratory movement to said lever to cause said container to move in a substantially elliptical path.

8. A support, a motor mounted thereon, a lever, an eccentric driven by said motor and operatively connected to said lever intermediate its ends, means controlling the movement of one end of said lever permitting a combined lengthwise and lateral vibratory movement of said lever in a plane at right angles to the axis of said eccentric, and means at the other end of said lever for supporting a container substantially in said plane with its axis transverse to the axis of said lever.

9. In a device of the kind described, an operating lever having a fork at one end, an operating shaft, an eccentric on said shaft, said lever having a bearing opening intermediate its ends, in which opening said eccentric is engaged, means for guiding the end of said lever remote from said fork permitting a combined lengthwise and lateral vibratory movement of said lever in a plane at right angles to said shaft, and a container removably mounted in said fork substantially in said plane with its axis transverse to the axis of said lever.

In testimony that I claim the foregoing as my invention, I affix my signature in the presence of two witnesses, this first day of March, A. D. 1923.

ALVIN L. JOHNSON.

Witnesses:
E. LIMOND,
C. C. GRADY.